US012688365B2

(12) United States Patent
Hosudurg et al.

(10) Patent No.: US 12,688,365 B2
(45) Date of Patent: Jul. 21, 2026

(54) ENHANCED NAMED ENTITY RECOGNITION (NER) USING CUSTOMBUILT REGULAR EXPRESSION (REGEX) MATCHER AND HEURISTIC ENTITY RULER

(71) Applicant: Tata Consultancy Services Limited, Mumbai (IN)

(72) Inventors: Anantha Desik Puranam Hosudurg, Hyderabad (IN); Sumiran Naman, Pune (IN); Ashim Roy, Pune (IN); Nikhil Girish Patwardhan, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 158 days.

(21) Appl. No.: 18/483,421

(22) Filed: Oct. 9, 2023

(65) Prior Publication Data

US 2024/0152699 A1     May 9, 2024

(30) Foreign Application Priority Data

Nov. 8, 2022     (IN) ............................ 202221063669

(51) Int. Cl.
*G06F 40/295* (2020.01)
*G06F 40/205* (2020.01)
*G06F 40/284* (2020.01)

(52) U.S. Cl.
CPC .......... *G06F 40/295* (2020.01); *G06F 40/205* (2020.01); *G06F 40/284* (2020.01)

(58) Field of Classification Search
CPC ..... G06F 40/295; G06F 40/284; G06F 40/205
See application file for complete search history.

(56) References Cited

U.S. PATENT DOCUMENTS

| | | | |
|---|---|---|---|
| 11,429,790 B2 | 8/2022 | Finkelshtein et al. | |
| 2016/0210317 A1* | 7/2016 | Krauss | G06N 5/022 |
| 2020/0192979 A1* | 6/2020 | Liu | G06F 18/2431 |
| 2020/0218856 A1* | 7/2020 | Narayan | G06F 40/295 |
| 2021/0182480 A1 | 6/2021 | Thomas | |
| 2022/0147714 A1 | 5/2022 | Reyderman | |
| 2023/0394235 A1* | 12/2023 | Rahman | G06F 40/226 |

* cited by examiner

*Primary Examiner* — Pierre Louis Desir
*Assistant Examiner* — Daniel W Chung
(74) *Attorney, Agent, or Firm* — FINNEGAN, HENDERSON, FARABOW, GARRETT & DUNNER LLP

(57)     ABSTRACT
Pre-trained models for Named Entity Recognition (NER) come with static NE classes, limited in number, and remain same irrespective of domain of the input text. Thus, domain specific training is required. Embodiments of the present disclosure provide a method and system for enhanced NER using a custom-built REGEX matcher and a heuristic entity ruler. The invention helps in discovering the NE's of the given text with pipeline-based approach with combination of models of NLP transformer, custom-built REGEX, and heuristic entity rules. The method automatically handles class resolution based on the heuristic entity ruler. The method enables a user to customize or add any new heuristic rules for entity ruler or custom regex as a knowledgebase to train the model with automatic relearning and unlearning. The extracted NEs are provided for further processing or masking in a structured format.

6 Claims, 8 Drawing Sheets

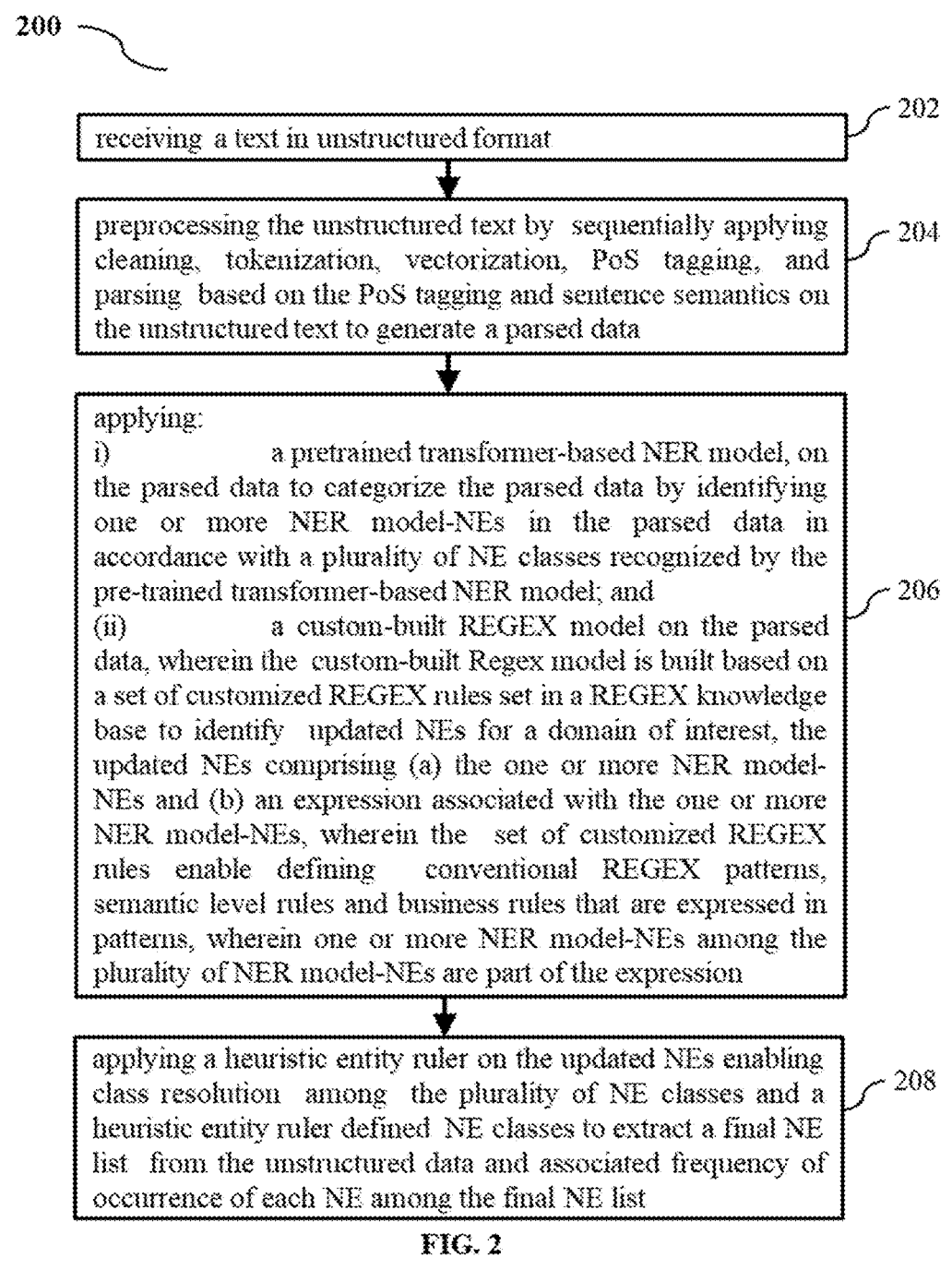

200

```
receiving a text in unstructured format                                    202
```

```
preprocessing the unstructured text by sequentially applying
cleaning, tokenization, vectorization, PoS tagging, and           204
parsing based on the PoS tagging and sentence semantics on
the unstructured text to generate a parsed data
```

```
applying:
i)                 a pretrained transformer-based NER model, on
the parsed data to categorize the parsed data by identifying
one or more NER model-NEs in the parsed data in
accordance with a plurality of NE classes recognized by the
pre-trained transformer-based NER model; and                             206
(ii)               a custom-built REGEX model on the parsed
data, wherein the custom-built Regex model is built based on
a set of customized REGEX rules set in a REGEX knowledge
base to identify updated NEs for a domain of interest, the
updated NEs comprising (a) the one or more NER model-
NEs and (b) an expression associated with the one or more
NER model-NEs, wherein the set of customized REGEX
rules enable defining conventional REGEX patterns,
semantic level rules and business rules that are expressed in
patterns, wherein one or more NER model-NEs among the
plurality of NER model-NEs are part of the expression
```

```
applying a heuristic entity ruler on the updated NEs enabling
class resolution among the plurality of NE classes and a              208
heuristic entity ruler defined NE classes to extract a final NE
list from the unstructured data and associated frequency of
occurrence of each NE among the final NE list
```

FIG. 2

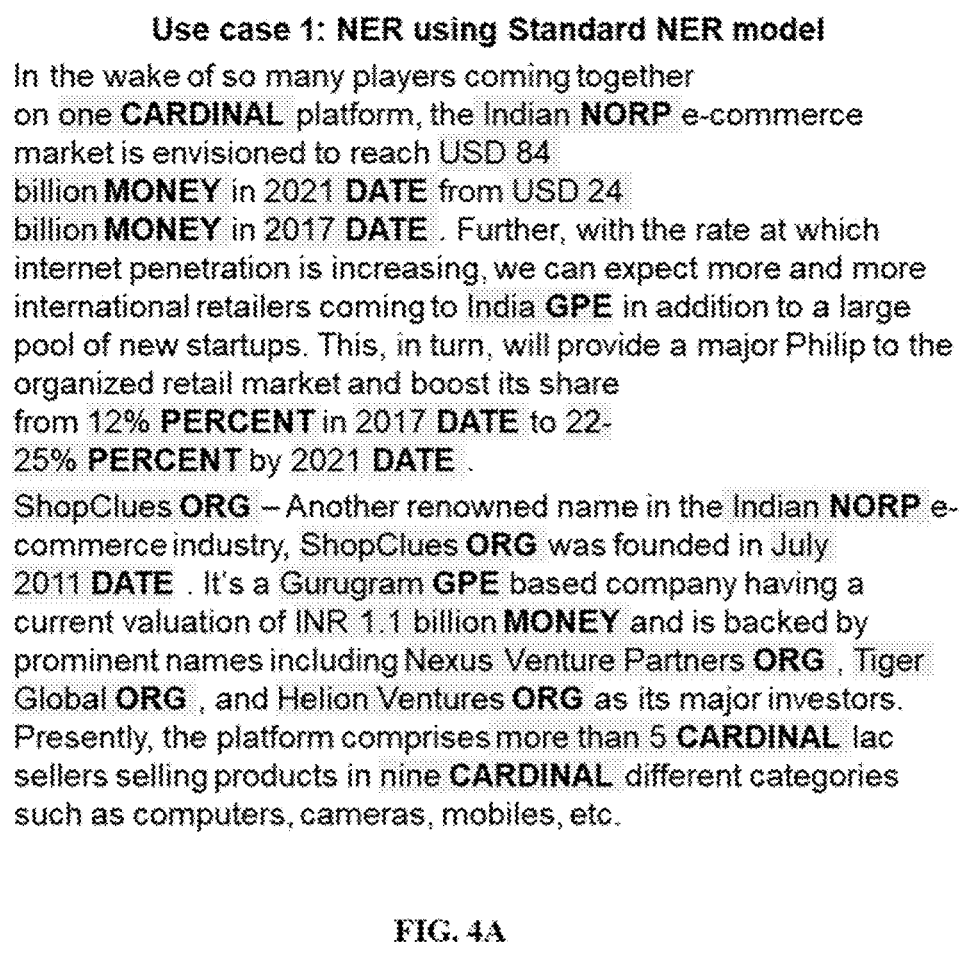

Use case 1: NER using Standard NER model

In the wake of so many players coming together
on one CARDINAL platform, the Indian NORP e-commerce
market is envisioned to reach USD 84
billion MONEY in 2021 DATE from USD 24
billion MONEY in 2017 DATE . Further, with the rate at which
internet penetration is increasing, we can expect more and more
international retailers coming to India GPE in addition to a large
pool of new startups. This, in turn, will provide a major Philip to the
organized retail market and boost its share
from 12% PERCENT in 2017 DATE to 22-
25% PERCENT by 2021 DATE .

ShopClues ORG – Another renowned name in the Indian NORP e-
commerce industry, ShopClues ORG was founded in July
2011 DATE . It's a Gurugram GPE based company having a
current valuation of INR 1.1 billion MONEY and is backed by
prominent names including Nexus Venture Partners ORG , Tiger
Global ORG , and Helion Ventures ORG as its major investors.
Presently, the platform comprises more than 5 CARDINAL lac
sellers selling products in nine CARDINAL different categories
such as computers, cameras, mobiles, etc.

FIG. 4A

Use case 1- NER using method 200

In the wake of so many players coming together
on one CARDINAL platform, the Indian NORP e-
commerce market is envisioned to reach USD 84
billion MONEY in 2021 DATE from USD 24
billion MONEY in 2017 DATE . Further, with the rate at
which internet penetration is increasing, we can expect
more and more international retailers coming
to India GPE in addition to a large pool of new startups.
This, in turn, will provide a major Philip to the organized
retail market and boost its share
from 12% PERCENT in 2017 DATE to 22-
25% PERCENT by 2021 DATE .
ShopClues ORG – Another renowned name in
the Indian NORP e-commerce
industry, ShopClues ORG was founded in July
2011 DATE . It's a Gurugram Indian City based
company having a current valuation of INR 1.1
billion MONEY and is backed by prominent names
including Nexus Venture Partners ORG , Tiger
Global ORG , and Helion Ventures ORG as its major
investors. Presently, the platform comprises more than
5 CARDINAL lac sellers selling products
in nine CARDINAL different categories such as
computers ELECTRONICS , cameras ELECTRONICS ,
mobiles ELECTRONICS , etc.

FIG. 4B

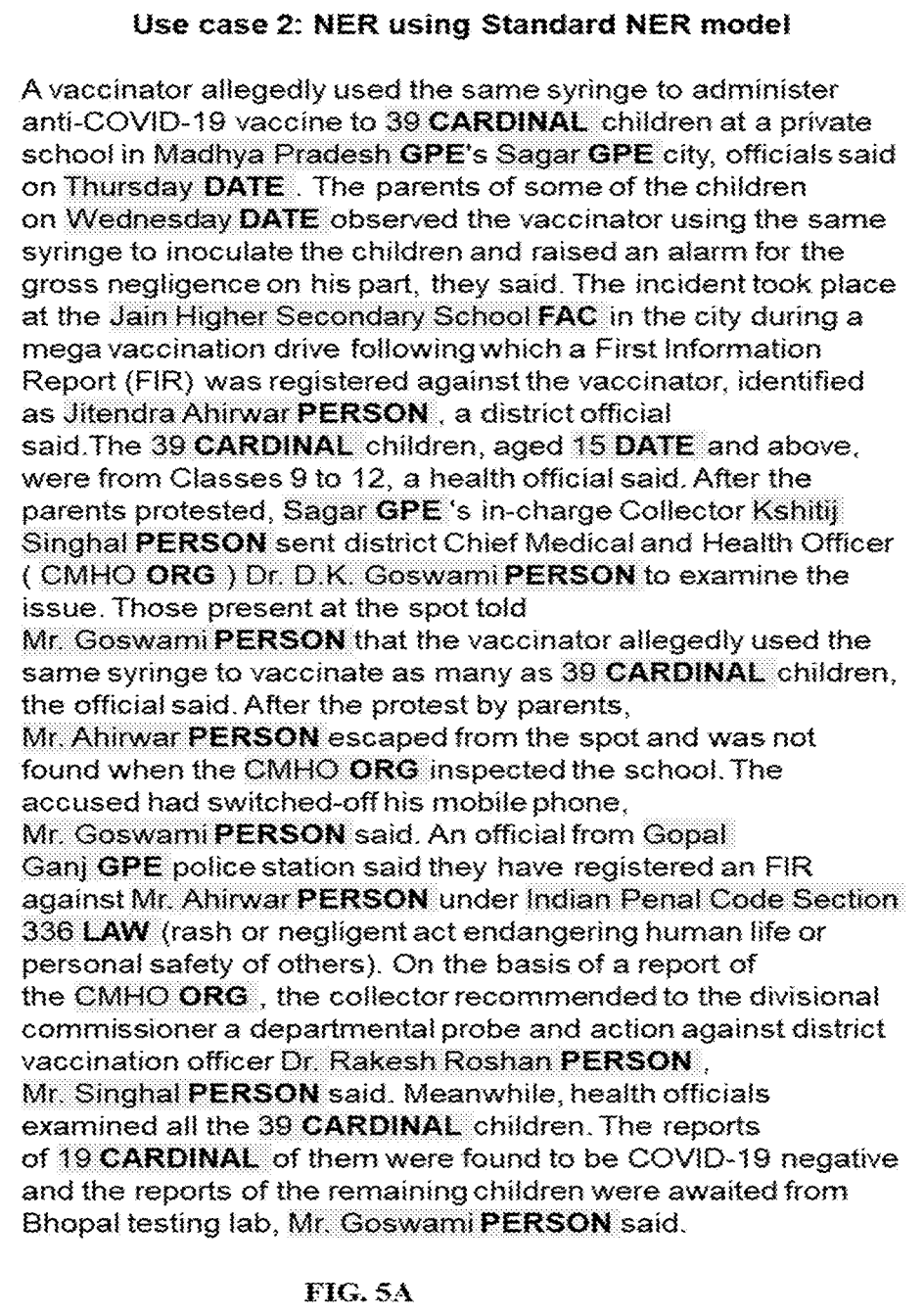

Use case 2: NER using Standard NER model

A vaccinator allegedly used the same syringe to administer
anti-COVID-19 vaccine to 39 CARDINAL children at a private
school in Madhya Pradesh GPE's Sagar GPE city, officials said
on Thursday DATE . The parents of some of the children
on Wednesday DATE observed the vaccinator using the same
syringe to inoculate the children and raised an alarm for the
gross negligence on his part, they said. The incident took place
at the Jain Higher Secondary School FAC in the city during a
mega vaccination drive following which a First Information
Report (FIR) was registered against the vaccinator, identified
as Jitendra Ahirwar PERSON , a district official
said.The 39 CARDINAL children, aged 15 DATE and above,
were from Classes 9 to 12, a health official said. After the
parents protested, Sagar GPE 's in-charge Collector Kshitij
Singhal PERSON sent district Chief Medical and Health Officer
( CMHO ORG ) Dr. D.K. Goswami PERSON to examine the
issue. Those present at the spot told
Mr. Goswami PERSON that the vaccinator allegedly used the
same syringe to vaccinate as many as 39 CARDINAL children,
the official said. After the protest by parents,
Mr. Ahirwar PERSON escaped from the spot and was not
found when the CMHO ORG inspected the school. The
accused had switched-off his mobile phone,
Mr. Goswami PERSON said. An official from Gopal
Ganj GPE police station said they have registered an FIR
against Mr. Ahirwar PERSON under Indian Penal Code Section
336 LAW (rash or negligent act endangering human life or
personal safety of others). On the basis of a report of
the CMHO ORG , the collector recommended to the divisional
commissioner a departmental probe and action against district
vaccination officer Dr. Rakesh Roshan PERSON ,
Mr. Singhal PERSON said. Meanwhile, health officials
examined all the 39 CARDINAL children. The reports
of 19 CARDINAL of them were found to be COVID-19 negative
and the reports of the remaining children were awaited from
Bhopal testing lab, Mr. Goswami PERSON said.

FIG. 5A

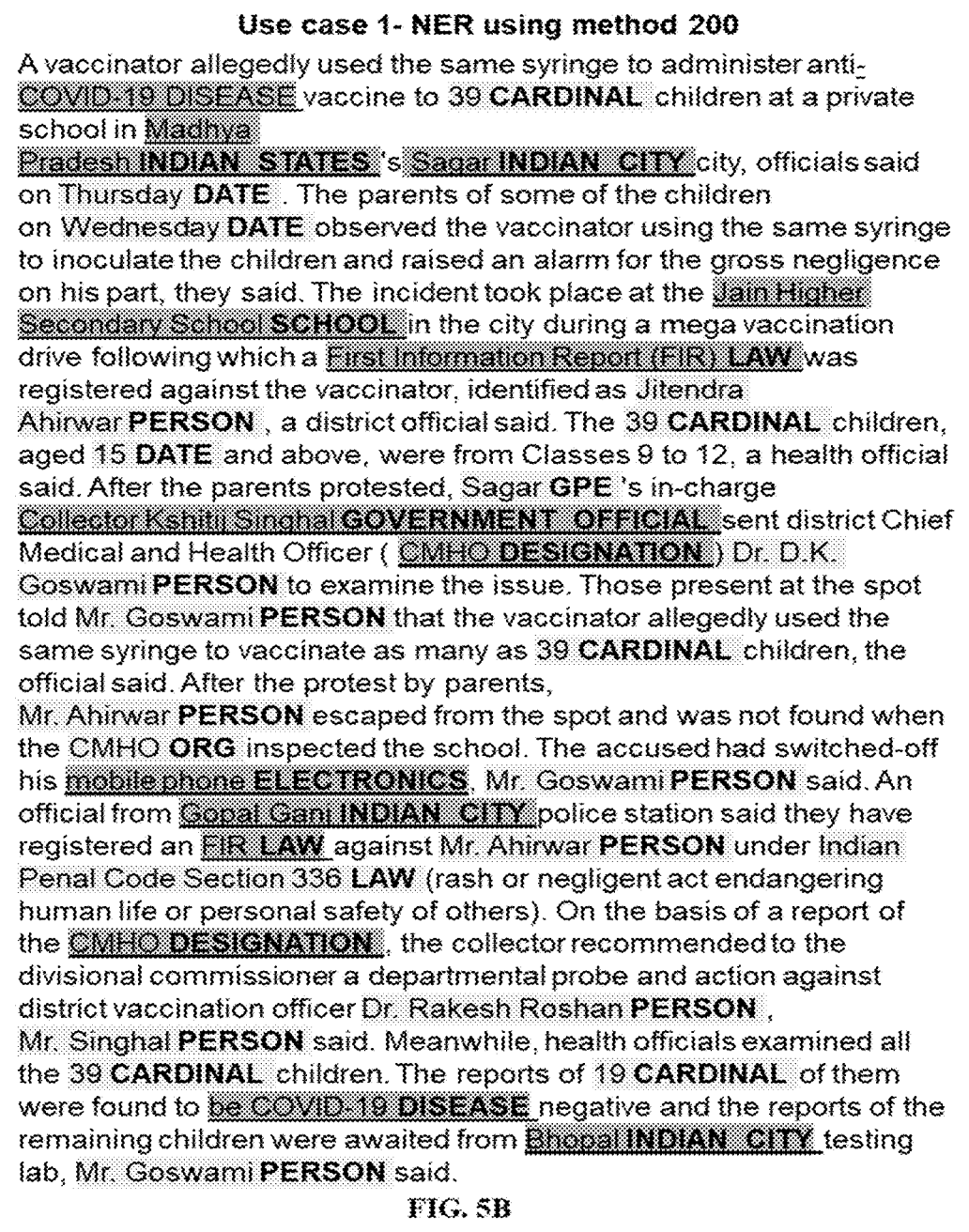

Use case 1- NER using method 200

A vaccinator allegedly used the same syringe to administer anti-COVID-19 DISEASE vaccine to 39 CARDINAL children at a private school in Madhya Pradesh INDIAN_STATES 's Sagar INDIAN_CITY city, officials said on Thursday DATE . The parents of some of the children on Wednesday DATE observed the vaccinator using the same syringe to inoculate the children and raised an alarm for the gross negligence on his part, they said. The incident took place at the Jain Higher Secondary School SCHOOL in the city during a mega vaccination drive following which a First Information Report (FIR) LAW was registered against the vaccinator, identified as Jitendra Ahirwar PERSON , a district official said. The 39 CARDINAL children, aged 15 DATE and above, were from Classes 9 to 12, a health official said. After the parents protested, Sagar GPE 's in-charge Collector Kshitij Singhal GOVERNMENT_OFFICIAL sent district Chief Medical and Health Officer ( CMHO DESIGNATION ) Dr. D.K. Goswami PERSON to examine the issue. Those present at the spot told Mr. Goswami PERSON that the vaccinator allegedly used the same syringe to vaccinate as many as 39 CARDINAL children, the official said. After the protest by parents, Mr. Ahirwar PERSON escaped from the spot and was not found when the CMHO ORG inspected the school. The accused had switched-off his mobile phone ELECTRONICS , Mr. Goswami PERSON said. An official from Gopal Ganj INDIAN_CITY police station said they have registered an FIR LAW against Mr. Ahirwar PERSON under Indian Penal Code Section 336 LAW (rash or negligent act endangering human life or personal safety of others). On the basis of a report of the CMHO DESIGNATION , the collector recommended to the divisional commissioner a departmental probe and action against district vaccination officer Dr. Rakesh Roshan PERSON , Mr. Singhal PERSON said. Meanwhile, health officials examined all the 39 CARDINAL children. The reports of 19 CARDINAL of them were found to be COVID-19 DISEASE negative and the reports of the remaining children were awaited from Bhopal INDIAN_CITY testing lab, Mr. Goswami PERSON said.

FIG. 5B

ENHANCED NAMED ENTITY RECOGNITION (NER) USING CUSTOMBUILT REGULAR EXPRESSION (REGEX) MATCHER AND HEURISTIC ENTITY RULER

PRIORITY CLAIM

This U.S. patent application claims priority under 35 U.S.C. § 119 to: Indian Patent Application No. 202221063669, filed on 8 Nov. 2022. The entire contents of the aforementioned application are incorporated herein by reference.

TECHNICAL FIELD

The embodiments herein generally relate to the field of Named Entity Recognition (NER) and, more particularly, to a method and system for enhanced Named Entity Recognition (NER) using custom-built Regular Expression (REGEX) matcher and heuristic entity ruler.

BACKGROUND

Named Entity Recognition (NER) is one the major component of Natural Language Processing (NLP) tasks aiming at information extraction. Once information is extracted, it has multitude applications such as identifying and securing Personal Identifiable Information (PII), Knowledge Base construction and so on. While pre-trained models exist for NER, the identified classes of Named Entities (NEs) are static, limited in number and remain same irrespective of domain of the input text being processed for NER. Furthermore, NER models need to be custom trained for the application domain such as health domain, law domain for accurate identification of NEs in respective domain. Furthermore, most of the existing methods utilize NER models with training based on domain of interest. Thus, if application domain or Named Entity context changes, it is necessary to retrain of the NER models. Retraining is well understood in the art, and is associated with huge costs, specifically generating training data, can be a significant deterrent for doing so. Providing a generalized NER solution across domain with minimal training effort is a research area of interest.

SUMMARY

Embodiments of the present disclosure present technological improvements as solutions to one or more of the above-mentioned technical problems recognized by the inventors in conventional systems.

For example, in one embodiment, a method for Named Entity Recognition (NER) is provided.

The method includes receiving a text document comprising unstructured text. Further, the method includes preprocessing the unstructured text by sequentially applying cleaning, tokenization, vectorization, Parts of Speech (PoS) tagging, and parsing based on the PoS tagging and sentence semantics on the unstructured text to generate a parsed data. Further, the method includes applying (i) a pretrained transformer-based NER model, on the parsed data to categorize the parsed data by identifying one or more NER model-NEs in the parsed data in accordance with a plurality of NE classes recognized by the pre-trained transformer-based NER model; and (ii) a custom-built REGEX matcher on the parsed data, wherein the custom-built REGEX matcher is based on a set of customized REGEX rules associated with a REGEX knowledge base to identify updated NEs for a domain of interest, wherein the updated NEs comprising (a) the one or more NER model-NEs, and (b) an expression associated with the one or more NER model-NEs, wherein the set of customized REGEX rules enable defining conventional REGEX patterns, semantic level rules and business rules that are expressed in patterns, wherein the one or more NER model-NEs among the plurality of NER model-NEs are part of the expression. Furthermore, the method includes applying a heuristic entity ruler on the updated NEs enabling class resolution among the plurality of NE classes and a heuristic entity ruler defined NE classes to extract a final NE list from the unstructured data and associated frequency of occurrence of each NE among the final NE list, wherein the heuristic entity ruler is based on a set of heuristic rules associated with an entity ruler knowledge base, wherein the class resolution states, all NEs identified by the pretrained transformer-based NER model and the custom-built REGEX matcher to be overwritten by the heuristic entity ruler if the heuristic entity ruler finds a new NE class.

In another aspect, a system for a method for Named Entity Recognition (NER) is provided. The system comprises a memory storing instructions; one or more Input/Output (I/O) interfaces; and one or more hardware processors coupled to the memory via the one or more I/O interfaces, wherein the one or more hardware processors are configured by the instructions to receive a text document comprising unstructured text. Further, the one or more hardware processors are configured to preprocess the unstructured text by sequentially applying cleaning, tokenization, vectorization, Parts of Speech (PoS) tagging, and parsing based on the PoS tagging and sentence semantics on the unstructured text to generate a parsed data. Further, the one or more hardware processors are configured to apply (i) a pretrained transformer-based NER model, on the parsed data to categorize the parsed data by identifying one or more NER model-NEs in the parsed data in accordance with a plurality of NE classes recognized by the pre-trained transformer-based NER model; and (ii) a custom-built REGEX matcher on the parsed data, wherein the custom-built REGEX matcher is based on a set of customized REGEX rules associated with a REGEX knowledge base to identify updated NEs for a domain of interest, wherein the updated NEs comprising (a) the one or more NER model-NEs, and (b) an expression associated with the one or more NER model-NEs, wherein the set of customized REGEX rules enable defining conventional REGEX patterns, semantic level rules and business rules that are expressed in patterns, wherein the one or more NER model-NEs among the plurality of NER model-NEs are part of the expression. Furthermore, the one or more hardware processors are configured to apply a heuristic entity ruler on the updated NEs enabling class resolution among the plurality of NE classes and a heuristic entity ruler defined NE classes to extract a final NE list from the unstructured data and associated frequency of occurrence of each NE among the final NE list, wherein the heuristic entity ruler is based on a set of heuristic rules associated with an entity ruler knowledge base, wherein the class resolution states, all NEs identified by the pretrained transformer-based NER model and the custom-built REGEX matcher to be overwritten by the heuristic entity ruler if the heuristic entity ruler finds a new NE class.

In yet another aspect, there are provided one or more non-transitory machine-readable information storage mediums comprising one or more instructions, which when executed by one or more hardware processors causes a method for Named Entity Recognition (NER) is provided.

The method includes receiving a text document comprising unstructured text. Further, the method includes preprocessing the unstructured text by sequentially applying cleaning, tokenization, vectorization, Parts of Speech (PoS) tagging, and parsing based on the PoS tagging and sentence semantics on the unstructured text to generate a parsed data. Further, the method includes applying (i) a pretrained transformer-based NER model, on the parsed data to categorize the parsed data by identifying one or more NER model-NEs in the parsed data in accordance with a plurality of NE classes recognized by the pre-trained transformer-based NER model; and (ii) a custom-built REGEX matcher on the parsed data, wherein the custom-built REGEX matcher is based on a set of customized REGEX rules associated with a REGEX knowledge base to identify updated NEs for a domain of interest, wherein the updated NEs comprising (a) the one or more NER model-NEs, and (b) an expression associated with the one or more NER model-NEs, wherein the set of customized REGEX rules enable defining conventional REGEX patterns, semantic level rules and business rules that are expressed in patterns, wherein the one or more NER model-NEs among the plurality of NER model-NEs are part of the expression. Furthermore, the method includes applying a heuristic entity ruler on the updated NEs enabling class resolution among the plurality of NE classes and a heuristic entity ruler defined NE classes to extract a final NE list from the unstructured data and associated frequency of occurrence of each NE among the final NE list, wherein the heuristic entity ruler is based on a set of heuristic rules associated with an entity ruler knowledge base, wherein the class resolution states, all NEs identified by the pretrained transformer-based NER model and the custom-built REGEX matcher to be overwritten by the heuristic entity ruler if the heuristic entity ruler finds a new NE class.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 2 is a flow diagram illustrating a method for enhanced Named Entity Recognition (NER) using the custom-built REGEX matcher and the heuristic entity ruler, using the system of FIG. 1, in accordance with some embodiments of the present disclosure.

FIGS. 4A through 5B are examples depicting of Named Entities (NEs) extracted using a standard pretrained transformer-based NER model as compared to NEs extracted by the system of FIG. 1 using the custom-built REGEX matcher and the heuristic entity ruler.

Figure 1:
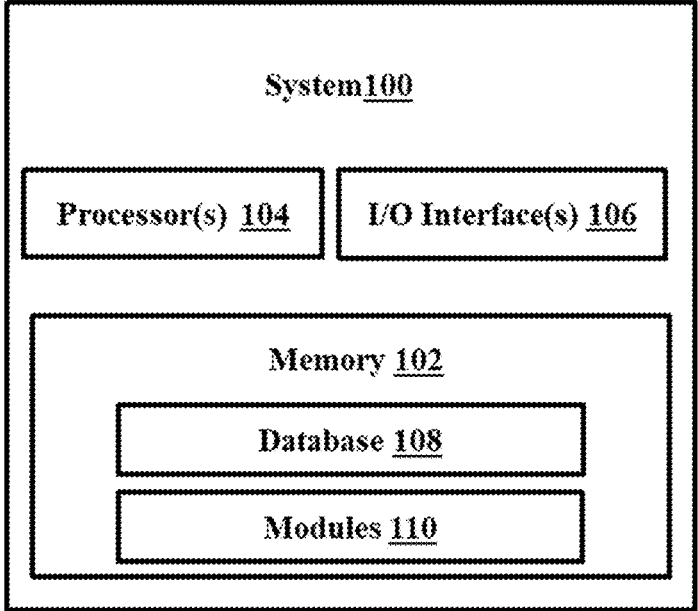
FIG. 1 is a functional block diagram of a system, for enhanced Named Entity Recognition (NER) using a custom-built Regular Expression (REGEX) matcher and a heuristic entity ruler, in accordance with some embodiments of the present disclosure.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Named Entity Recognition (NER) model which identifies a best suited category or class for entity present in input text is limited to predefined number of Named Entity (NE) classes. For example, state of art transformer architecture-based NER the default NEs that are defined in a pre-trained NER model are 18 (CARDINAL, DATE, EVENT, FAC, GPE, LANGUAGE, LAW, LOC, MONEY, NORP, ORDINAL, ORG, PERCENT, PERSON, PRODUCT, QUANTITY, TIME, WORK_OF_ART). Accuracy improvement of Named Entities (NEs) recognized by a Named Entity Recognition (NER) model is improved with components such as Regular Expressions (REGEX) and entity rulers. REGEX component has been regularly used to quickly identify attributes of standard format, like email or uniform resource locator (URL) while some existing works combine it with Machine Learning (ML) models. However, it can be understood that these approach are custom built and require retraining when Named Entities (NEs) to be identified are different. Similarly, the entity ruler component allows to add named entities based on pattern dictionaries. Entity rules can be phrase patterns for exact string matches or token patterns for full flexibility.

Even though REGEX and entity rulers have been used to improve NER accuracy, they are focused for a specific application domain. There are hardly any attempts in the art provide solutions to enable REGEX and entity rulers to learn and unlearn the new domain without need to retrain the NER model with updated classes or categories of the NEs. For solutions in art, entirety of the NER model needs to be trained with updated class/categories. Further, technical limitation of conventional REGEX is that it is pattern driven and not based on custom rules that include NEs defined by standard NER model. Similarly, conventional entity rulers are just simple dictionary searches, whereas the embodiments disclosed here provides NLP capability on top of NER that adds on the next level of NEs or domain specific NEs.

Embodiments of the present disclosure provide a method and system for enhanced Named Entity Recognition (NER) using a custom-built REGEX matcher and a heuristic entity ruler. The invention helps in discovering the NE's of the given text with NLP pipeline-based approach with combination of NER models of Natural Language Processing (NLP) transformer, custom-built REGEX, and heuristic entity rules. The method automatically handles class resolution based on the heuristic entity ruler. The method enables a user to customize or add any new heuristic rules for entity ruler or custom regex as a knowledgebase to train the model with automatic relearning and unlearning. The extracted NEs are provided for further processing or masking in a structured format.

Referring now to the drawings, and more particularly to FIGS. 1 through 6, where similar reference characters denote corresponding features consistently throughout the figures, there are shown preferred embodiments and these embodiments are described in the context of the following exemplary system and/or method.

FIG. 1 is a functional block diagram of a system 100, for enhanced Named Entity Recognition (NER using the custom-built REGEX matcher and the heuristic entity ruler, in accordance with some embodiments of the present disclosure. In an embodiment, the system 100 includes a processor(s) 104, communication interface device(s), alternatively referred as input/output (I/O) interface(s) 106, and one or more data storage devices or a memory 102 operatively coupled to the processor(s) 104. The system 100 with one or more hardware processors is configured to execute functions of one or more functional blocks of the system 100.

Referring to the components of system 100, in an embodiment, the processor(s) 104, can be one or more hardware processors 104. In an embodiment, the one or more hardware processors 104 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102. In an embodiment, the system 100 can be implemented in a variety of computing systems including laptop computers, notebooks, hand-held devices such as mobile phones, workstations, mainframe computers, servers, and the like.

The I/O interface(s) 106 can include a variety of software and hardware interfaces, for example, a web interface, a graphical user interface to display the generated target images and the like and can facilitate multiple communications within a wide variety of networks N/W and protocol types, including wired networks, for example, LAN, cable, etc., and wireless networks, such as WLAN, cellular and the like. In an embodiment, the I/O interface (s) 106 can include one or more ports for connecting to a number of external devices or to another server or devices.

Figure 3:
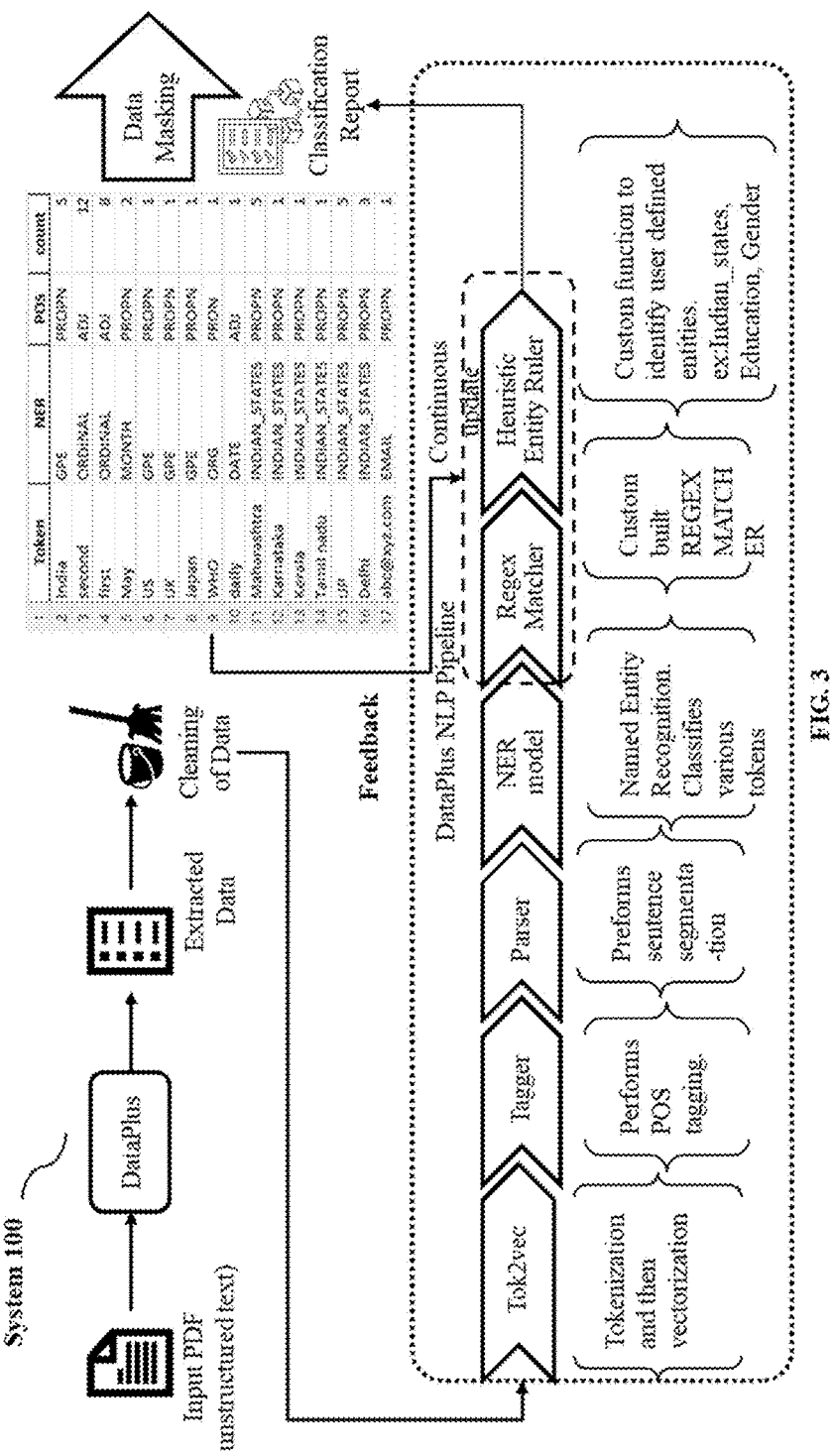
FIG. 3 illustrates an architectural overview of the system of FIG. 1, in accordance with some embodiments of the present disclosure.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 102 includes a plurality of modules 110 that incudes modules such as a pretrained transformer-based NER model, also referred to as NER model (as depicted in FIG. 3), the custom-built REGEX matcher, also referred to as REGEX matcher (as depicted in FIG. 3), the heuristic entity ruler (as depicted in FIG. 3), and the like. Further, the plurality of modules 110 include programs or coded instructions that supplement applications or functions performed by the system 100 for executing different steps involved in the process of enhanced NER, being performed by the system 100. The plurality of modules 110, amongst other things, can include routines, programs, objects, components, and data structures, which performs particular tasks or implement particular abstract data types. The plurality of modules 110 may also be used as, signal processor(s), node machine(s), logic circuitries, and/or any other device or component that manipulates signals based on operational instructions. Further, the plurality of modules 110 can be used by hardware, by computer-readable instructions executed by the one or more hardware processors 104, or by a combination thereof. The plurality of modules 110 can include various sub-modules (not shown).

Further, the memory 102 may comprise information pertaining to input(s)/output(s) of each step performed by the processor(s) 104 of the system 100 and methods of the present disclosure. Further, the memory 102 includes a database 108. The database 108 may comprise a customized REGEX knowledge base associated with a set of customized REGEX rules and an entity ruler knowledge base associated with a set of heuristic rules. The database (or repository) 108 may include a plurality of abstracted piece of code for refinement and data that is processed, received, or generated as a result of the execution of the plurality of modules in the module(s) 110.

Although the database 108 is shown internal to the system 100, it will be noted that, in alternate embodiments, the database 108 can also be implemented external to the system 100, and communicatively coupled to the system 100. The data contained within such external database may be periodically updated. For example, new data may be added into the database (not shown in FIG. 1) and/or existing data may be modified and/or non-useful data may be deleted from the database. In one example, the data may be stored in an external system, such as a Lightweight Directory Access Protocol (LDAP) directory and a Relational Database Management System (RDBMS). Functions of the components of the system 100 are now explained with reference to steps in flow diagrams in FIG. 2 and architectural overview of system 100 as depicted in FIG. 3.

FIG. 2 is a flow diagram illustrating a method 200 for enhanced NER using the custom-built REGEX matcher and the heuristic entity ruler, using the system 100 of FIG. 1, in accordance with some embodiments of the present disclosure. In an embodiment, the system 100 comprises one or more data storage devices or the memory 102 operatively coupled to the processor(s) 104 and is configured to store instructions for execution of steps of the method 200 by the processor(s) or one or more hardware processors 104. The steps of the method 200 of the present disclosure will now be explained with reference to the components or blocks of the system 100 as depicted in FIGS. 1 and 3 and the steps of flow diagram as depicted in FIG. 2. Although process steps, method steps, techniques or the like may be described in a sequential order, such processes, methods, and techniques may be configured to work in alternate orders. In other words, any sequence or order of steps that may be described does not necessarily indicate a requirement that the steps to be performed in that order. The steps of processes described herein may be performed in any order practical. Further, some steps may be performed simultaneously.

Referring to the steps of the method 200, at step 202, the one or more hardware processors 104 receive a text document comprising unstructured text. As depicted in FIG. 3, any received input document, for example, in a pdf format, is read and converted to the text document for further processing. At step 204, the one or more hardware processors 104 preprocess the unstructured text by sequentially applying cleaning, tokenization, vectorization, Parts of Speech (PoS) tagging, and parsing based on the PoS tagging and sentence semantics on the unstructured text to generate a parsed data. While conversion from one format to another there are some special characters that do not get properly encoded in text format. Such formats are rendered unreadable. The unreadable characters are removed for any further analysis and processing (for example, TCS MasterCraft™ DataPlus as in FIG. 3). The cleaned text file is then sent to the NLP pipeline comprising the pretrained transformer-based NER model, also referred to as NER model (as depicted in FIG. 3), the custom-built REGEX matcher, also referred to as REGEX matcher (as depicted in FIG. 3), the heuristic entity ruler (as depicted in FIG. 3). As well known in the NLP domain, the first step in pipeline is tokenization, where larger chunks of information (text) are divided into smaller tokens for better and faster processing. Once the text is divided into tokens, to speed up the processing time of NLP processes, a tok2vec (as depicted in FIG. 3) converts the string representation of data to numerical representation of data into token and vectors. Vectorization encodes the information represented in string to vectors. Thereafter, a Part-Of-Speech tagging (as depicted in FIG. 3), which is a listener to tok2vec performs the tagging of respective parts of speech to vectors for understanding the sentence. The parser component (FIG. 3), which is also a listener to tok2vec parses the sentences of the text based on the POS tags and sentence semantics. It understands the information present in the sentence to map the subject, object and the action being taken. The parser stage helps in mapping the dependency of various parts of sentences to each other.

At step 206, the one or more hardware processors 104 apply following actions on the parsed data.

a) The pretrained transformer-based NER model (NER model of FIG. 3), categorizes the parsed data by identifying one or more NER model-NEs in the parsed data in accordance with a plurality of NE classes recognized by the pre-trained transformer-based NER model.

b) The custom-built REGEX matcher (REGEX matcher as in FIG. 3) is applied on the parsed data, wherein the custom-built REGEX matcher is based on the set of customized REGEX rules associated with a REGEX knowledge base to identify updated NEs for a domain of interest. The updated NEs comprise (a) the one or more NER model-NEs, and (b) an expression associated with the one or more NER model-NEs, wherein the set of customized REGEX rules enable defining conventional REGEX patterns, semantic level rules and business rules that are expressed in patterns, wherein one or more NER model-NEs among the plurality of NER model-NEs are part of the expression.

Thus, once the parsing is completed, the NLP pipeline applies Named Entity Recognition component, which identifies the best suited category or NE classes for the NE (entity) token. In an example implementation, the default number of Named Entities that are defined in pre-trained model are 18 (CARDINAL, DATE, EVENT, FAC, GPE, LANGUAGE, LAW, LOC, MONEY, NORP, ORDINAL, ORG, PERCENT, PERSON, PRODUCT, QUANTITY, TIME, WORK_OF_ART). The NER model used for all the NLP processes is based on state-of-art transformer architecture having accuracy of 90%. Even though it identifies 18 type of NEs, but it may not be sufficient to find all the NEs which are present in the particular text. The reason is that some of the alpha-numerical text and their variations cannot be identified by conventional NER which can be handled through REGEX defined dictionaries or the REGEX knowledge base (for example, abc@xyz.com: EMAIL, Copyright owned by {PERSON/ORG}: OWNER OF INFO). The second challenge is that pre-defined NEs may not be very accurate (may be generalized) and do not support the recognition of next level of NEs based on the domain, geography, and user. This can be handled by entity based knowledge dictionaries or the entity ruler knowledge base (ex: Gujarat: GPE→Gujarat: INDIAN_STATE, Mumbai: GPE→Mumbai: INDIAN CITY). The REGEX matcher and the heuristic entity ruler provide with intelligent collision resolution or NE class resolution. The knowledge bases provide capability to learn and unlearn to capture 100% of NEs of the given text.

In the REGEX matcher, which handles the complex requirements of patterns such as email, Social Security number (SSN) number, mobile number, etc., and business rule patterns. The REGEX matcher further identifies the NEs based on the REGEX knowledge base. The custom-built REGEX matcher (REGEX matcher) is different from the conventional REGEX matching such the custom-built REGEX matcher is capable of handling the conventional REGEX patterns such as email, mobile number, etc., and additionally handles semantic level and business rules that can be expressed in patterns and require NER model NEs that can be a part of expression. The REGEX matcher is capable of handling business rules where NLP NEs can be part of the business rules, thereby combining the output of NER and regex and give single NE. The REGEX knowledge base can be curated as per domain requirement. The initial REGEX knowledge base provided has been compiled from over the years industry experience of various domains and encompasses almost all REGEX patterns relevant in the domain specific scenarios. An example in TABLE 1 below provides the difference of NE recognition using a conventional REGEX matcher and the custom-built REGEX matcher.

TABLE 1

| Conventional Regex matcher (also captured by the method 200) | Not Possible in Conventional REGEX matcher but possible with custom-built REGEX matcher |
| --- | --- |
| abc@xyz.com: EMAIL, +91-XXXXXXXXXX: Mobile, [A-Z]{5}[0-9]{4}: PAN | Copyright owned by {PERSON/ORG}: OWNER_OF_INFO, Follow us on {URL}: SOCIAL_MEDIA_CONTACT |

The REGEX matcher is structured to handles all conventional alphanumerical patterns and business rule, all in one intelligent module. The REGEX matcher's output's confidence of matching is high and more accurate. In the NLP pipeline when the NER module tags some NEs, the REGEX Matcher also classifies it as one of the REGEX rules.

Internally the collision resolution (class resolution of NEs) is invoked as: "The NLP pipeline components occurring late in pipeline are at higher priority and the highest priority tag (NE class) is retained for the NEs". Further, the execution of REGEX Matcher is such that the already tagged REGEX NE is not overwritten in subsequent components and current tag will be considered final. In the invention the REGEX Matcher module has used the business rules and regex expressions gained and compiled from the knowledge of industry operations over the years bringing additional value to the invention knowledge base. Invention continuously increases the knowledge base as well allows user to add/update their own business rules.

The functional steps of the custom-built REGEX matcher are as below:

Input: NEs identified by the pretrained transformer-based NER model

Identification Process:

a) The custom-built REGEX Matcher is listener to tok2vec component b) Receives output of previous NLP pipeline components (for example, the NER model)

c) Identifies the group of tokens d) Traverses through the Regex knowledge base along with business rules knowledge base e) Identifies the correct mapping of the NEs f) If any collision, the custom-built REGEX Matcher overwrites the previous output to perform class resolution of NEs g) The final output is flagged off for further overwriting and identification in further components (heuristic entity ruler) of the NLP pipeline. However, it can be noted that position of the REGEX matcher and the heuristic entity ruler can be interchanged and the definition of 'further components' is to be interpreted according to the NLP pipeline.

h) Marks them for final output i) Feedback: the feedback from user is be added for next iterations of pipeline At step 208, the one or more hardware processors 104 apply the heuristic entity ruler on the updated NEs enabling class resolution among the plurality of NE classes and a heuristic entity ruler defined NE classes to extract a final NE list from the unstructured data and associated frequency of occurrence of each NE among the final NE list. A sample final list with classification report is depicted in FIG. 3. The classification report is stored in the database 108 and is customizable to the requirements of end user for specific end applications such as masking Personally Identifiable Information (PII) and the like. The heuristic entity ruler is based on the set of heuristic rules associated with an entity ruler knowledge base. The class resolution states that all NEs identified by the pretrained transformer-based NER model and the custom-built REGEX matcher to be overwritten by the heuristic entity ruler if the heuristic entity ruler finds a new NE class. The heuristic entity ruler defined NE classes are updated dynamically by training the heuristic entity ruler for deletion or addition pf one or more NE classes without need for retraining the pretrained transformer-based NER model. In domain specific NEs it is not possible to include all NEs in pre-defined list of NEs of any trained NER model. Also, the level of NEs in predefined list can be high-level NEs which can be further drilled down to finer NEs for user requirement. The existing well-known models like BERT, RoBERTa, GPT, etc., do not guarantee relevance over cross-domain NEs, ex: For manufacturing industry: CORONA: EDIBLE_BEER, for medical domain: CORONA: VIRUS DISEASE. Further, above conventional NLP models for NER require heavy infrastructure, resources, and time to be developed and deployed. The training of the NER model for various sub-domains again requires lot of architecture training data and post validations. The learning and unlearning of such models require the entire model to be retrained from scratch. The heuristic entity ruler in the NLP pipeline disclosed, is lightweight with very less training time, as learning/unlearning in pipeline only affects the selected NE and all other NEs are retained. The innovation provides seamless process for adding any new NEs, where user has to only provide name and list in plain English words, which the NLP pipeline of FIG. 3, intelligently converts into training format, as depicted in example of TABLE 2 below, for various components of pipeline.

TABLE 2

| User Input | Training Format - Automatically made by Pipeline |
|---|---|
| EDIBLES: | {"label": "EDIBLES", "pattern": [{"LOWER": "Bread"}]} |
| Bread, | {"label": "EDIBLES", "pattern": [{"LOWER": "Butter"}]} |
| Butter, | |
| Peanut, | {"label": "EDIBLES", "pattern": [{"LOWER": "Peanut"}]} |
| Potato | {"label": "EDIBLES", "pattern": [{"LOWER": "Potato"}]} |

The functional flow of the heuristic entity ruler is mentioned below: Input: NEs identified by the pretrained transformer-based NER model and the custom-built REGEX Matcher Identification Process:

a) Entity Ruler is listener to tok2vec component b) Takes output of previous NLP pipeline components (POS+NER pipeline component)

c) Identifies the group of tokens d) Traverses through knowledge base of different dictionaries e) Identifies the correct mapping of the NEs f) If any collision, Entity Ruler overwrites the previous output g) Marks them for final output h) The final identified NEs with their positions and tagged NEs is stored in entity ruler knowledge base.

i) Feedback: the feedback from user is added in form of data dictionary for next iterations of pipeline The Heuristic Entity Ruler provides the capability of accommodating all the changes that are required for business specific NEs. It is based on the defined knowledge base infused in the NLP pipeline. Multiple dictionaries can be digested by the pipeline. Entity Ruler helps to solve two problem areas:

a) Next-level NEs. Ex: Instead of Pune: GPE (Geo-Political Entity), tag it as Pune: INDIAN CITY b) Business specific NEs that are domain specific and not supported by any NLP model. Ex: For manufacturing industry: CORONA: EDIBLE_BEER, Ex: For medical domain: CORONA: VIRUS DISEASE Entity Ruler is defined in the NLP pipeline as the last component such that any NEs identified by this component are of highest priority and overwrite the pre-existing tag. Internally collision resolution method is invoked such that "the NEs which are identified by the earlier NLP components are overwritten by the heuristic entity ruler if the heuristic entity ruler also finds a suitable tag (NE class)."

The heuristic entity ruler uses the knowledge base gained and compiled from the knowledge of industry requirements over the years bringing additional value to the entity knowledge base. The knowledge base is continuously increased and allows user to add/update their own business rules. The heuristic entity ruler unlearns and learns NEs in very flexible way without discarding the whole pipeline as in case of traditional NLP models. The method 200 provide high re-usability and any changes made do not require starting from scratch.

FIGS. 4A through 5B are examples depicting of Named Entities (NEs) extracted using a standard pretrained transformer-based NER model as compared to NEs extracted by the system of FIG. 1 using the custom-built REGEX matcher and the heuristic entity ruler. The bold text in use case 1 of FIG. 4A and use case 2 of FIG. 5A indicates NE classes identified by NER model, while the grey shaded text with underline in FIG. 4B and FIG. 5B depicts further finetuned NEs with additional classes. As can be seen in FIG. 4A, the standard NER model identified 'India' and 'Gurugram' as GPE (geo-political entity), but this is very broad classification of entity as India and Gurugram certainly do not represent same type of GPE entity. However, as seen in FIG. 4B, the method 200 identified the correct level of entity where Gurugram is INDIAN_CITY, which conveys right information when identifying the NEs.

The NEs identified differently by the method 200 in FIG. 5B as compared to standard NER model of FIG. 5A are:

a) First Information Report (FIR), which was not identified by the standard NER model in FIG. 5A.

b) CMHO is labelled as ORG (Organization) in FIG. 5A, which is corrected in FIG. 5B as DESIGNATION c) Collector Kshitij Singhal was identified as PERSON in FIG. 5A, but in FIG. 5B from REGEX matcher rule: Collector {PERSON} was labelled as GOVERNMEN-T_OFFICIAL.

All NEs of FIG. 4B and FIG. 5B indicate the final NE list. The method 200 is robust and intelligent to provide the sub-level relevant NEs providing accurate information.

Figure 6:
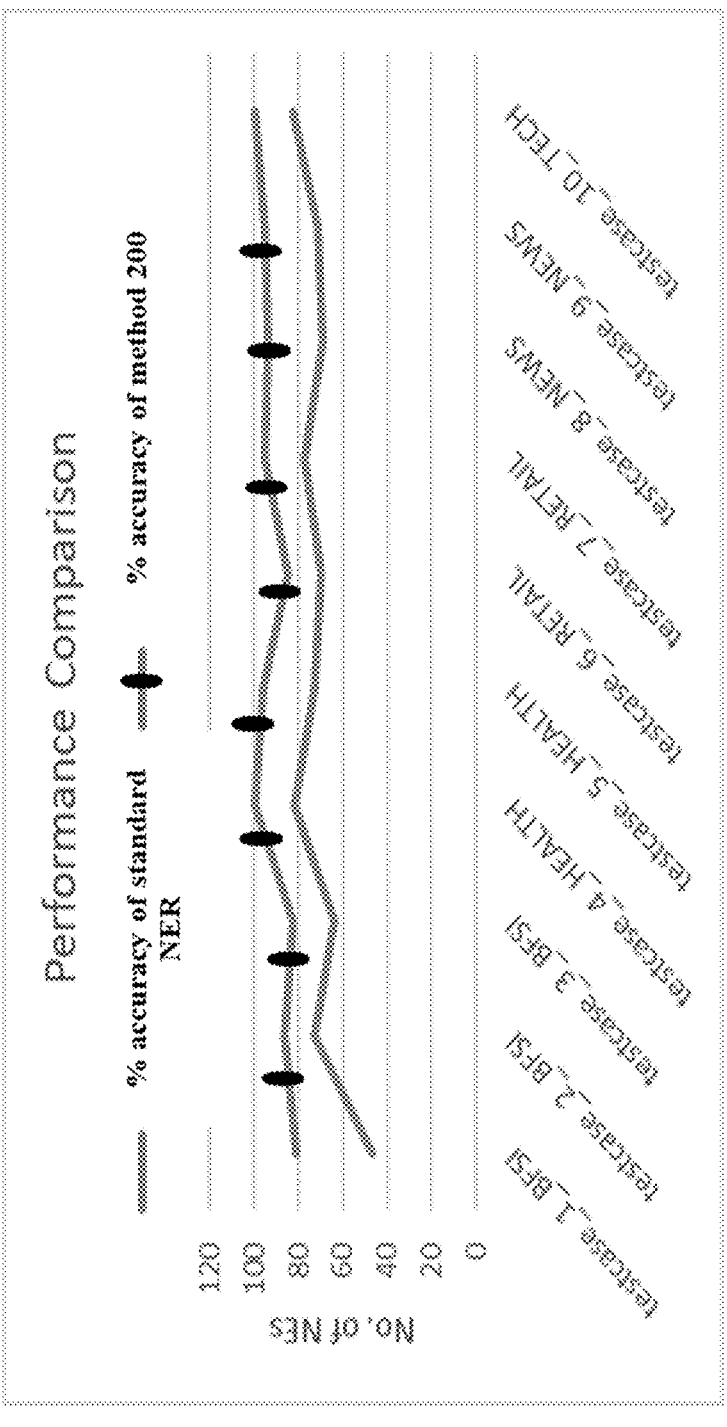
FIG. 6 illustrates a graphical representation of comparative analysis of the system of FIG. 1 with state of the art pretrained transformer-based NER model (standard NER model), in accordance with some embodiments of the present disclosure.

FIG. 6 illustrates a graphical illustration of a comparative analysis of the system of FIG. 1 with state of the art pretrained transformer-based NER model, in accordance with some embodiments of the present disclosure. The system 100 when applied on ten test data sets of different domains along with traditional NER model, as depicted in FIG. 6, the system 100 performs with better accuracy in all the test data sets.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g., an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g., using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for Named Entity Recognition (NER), the method comprising:

receiving, via one or more hardware processors, a text document comprising unstructured text;

converting the text document into another format for further processing, wherein the conversion of text document into another format includes removing unreadable characters that do not get properly encoded in a text format, making clean document to send in natural language processing (NLP) pipeline;

preprocessing, via the one or more hardware processors, the unstructured text by sequentially applying cleaning, tokenization divides larger chunks of text into smaller tokens for faster processing and converts string representation of data to numerical representation of data into a token and vectors by a tok2vec to speedup the processing time of NLP processes, vectorization, Parts of Speech (PoS) tagging, and parsing based on the PoS tagging and sentence semantics on the unstructured text to generate a parsed data for mapping dependency of various parts of sentences to each other;

applying, via the one or more hardware processors:

(i) a pretrained transformer-based NER model, on the parsed data to categorize the parsed data by identifying one or more NER model-NEs in the parsed data in accordance with a plurality of NE classes recognized by the pre-trained transformer-based NER model; and (ii) a custom-built REGEX matcher on the parsed data, wherein the custom-built REGEX matcher is based on a set of customized REGEX rules associated with a REGEX knowledge base with an ability to learn and unlearn to capture NEs of given text completely and curated as per domain requirement, identify updated NEs for a domain of interest, find alpha-numerical text and their variations, and handle complex requirements of patterns, wherein the updated NEs comprising (a) the one or more NER model-NEs, and (b) an expression associated with the one or more NER model-NEs, wherein the set of customized REGEX rules enable defining conventional REGEX patterns, semantic level rules and business rules that are expressed in patterns, wherein the one or more NER model-NEs among the plurality of NER model-NEs are part of the expression, combining the output of NER and regex and give single NE;

applying the NER in the NLP pipeline to identify suitable category or NE classes for the NE token; and applying, via the one or more hardware processors, a heuristic entity ruler on the updated NEs enabling class resolution among the plurality of NE classes and a heuristic entity ruler defined NE classes to extract a final NE list from the unstructured data and associated frequency of occurrence of each NE among the final NE list, wherein the final NE list with a classification report is customizable to requirements of end user for diverse applications, wherein the heuristic entity ruler is based on a set of heuristic rules associated with an entity ruler knowledge base, wherein the knowledge base is continuously increased and allows the end user to add or update with business rules and a feedback from the end user is added for next iterations of a NLP pipeline, wherein the class resolution states, all NEs identified by the pretrained transformer-based NER model and the custom-built REGEX matcher to be overwritten by the heuristic entity ruler if the heuristic entity ruler finds a new NE class, wherein the heuristic entity ruler defined NE classes are updated dynamically by training the heuristic entity ruler for deletion or addition of one or more NE classes without need for retraining the pretrained transformer-based NER model, wherein with the heuristic entity ruler, new NEs are added by the end user to provide only name and list in plain English words and the heuristic entity ruler converts components of the pipeline, the name and the list in plain English into a training format, wherein with the heuristic entity ruler for learning and unlearning requires less training time in the NLP pipeline only affects the selected NEs and remaining NEs are retained and provide high re-usability and any changes made do not require starting from scratch, wherein the heuristic entity ruler retains highest priority tagged NEs class and ensures the identified NEs by the earlier NLP components are not overwritten in subsequent components for consideration of the final suitable tag, where the NEs defined in the NLP pipeline as the last component that identified NEs by this component are of highest priority and overwrite the pre-existing tag, provide the sub-level relevant NEs and providing accurate information.

2. The method of claim 1, wherein the custom-built REGEX matcher enables class resolution between the plurality of NER-NEs and updated NEs, wherein the custom-built REGEX enables the user to customize or add new heuristic rules for entity ruler or custom regex as the knowledgebase to train the model with automatic relearning and unlearning, provide the extracted NEs or masking in a structured format.

3. A system for Named Entity Recognition (NER), the system comprising:

a memory storing instructions;

one or more Input/Output (I/O) interfaces; and one or more hardware processors coupled to the memory via the one or more I/O interfaces, wherein the one or more hardware processors are configured by the instructions to:

receive a text document comprising unstructured text;

convert the text document into another format for further processing, wherein the conversion of text document into another format includes removing unreadable characters that do not get properly encoded in a text format, making clean document to send in natural language processing (NLP) pipeline;

preprocess the unstructured text by sequentially applying cleaning, tokenization divides larger chunks of text into smaller tokens for faster processing and converts string representation of data to numerical representation of data into a token and vectors by a tok2vec to speedup the processing time of NLP processes, vectorization, Parts of Speech (PoS) tagging, and parsing based on the PoS tagging and sentence semantics on the unstructured text to generate a parsed data for mapping dependency of various parts of sentences to each other;

apply:

(i) a pretrained transformer-based NER model, on the parsed data to categorize the parsed data by identifying one or more NER model-NEs in the parsed data in accordance with a plurality of NE classes recognized by the pre-trained transformer-based NER model; and (ii) a custom-built REGEX matcher on the parsed data, wherein the custom-built REGEX matcher is based on a set of customized REGEX rules associated with a REGEX knowledge base with an ability to learn and unlearn to capture NEs of given text completely and curated as per domain requirement, identify updated NEs for a domain of interest, find alpha-numerical text and their variations, and handle complex requirements of patterns, wherein the updated NEs comprising (a) the one or more NER model-NEs, and (b) an expression associated with the one or more NER model-NEs, wherein the set of customized REGEX rules enable defining conventional REGEX patterns, semantic level rules and business rules that are expressed in patterns, wherein the one or more NER model-NEs among the plurality of NER model-NEs are part of the expression, combining the output of NER and regex and give single NE;

apply the NER in the NLP pipeline to identify suitable category or NE classes for the NE token; and apply a heuristic entity ruler on the updated NEs enabling class resolution among the plurality of NE classes and a heuristic entity ruler defined NE classes to extract a final NE list from the unstructured data and associated frequency of occurrence of each NE among the final NE list, wherein the final NE list with a classification report is customizable to requirements of end user for diverse applications, wherein the heuristic entity ruler is based on a set of heuristic rules associated with an entity ruler knowledge base, wherein the knowledge base is continuously increased and allows the end user to add or update with business rules and a feedback from the end user is added for next iterations of a NLP pipeline, wherein the class resolution states, all NEs identified by the pretrained transformer-based NER model and the custom-built REGEX matcher to be overwritten by the heuristic entity ruler if the heuristic entity ruler finds a new NE class, wherein the heuristic entity ruler defined NE classes are updated dynamically by training the heuristic entity ruler for deletion or addition of one or more NE classes without need for retraining the pretrained transformer-based NER model, wherein with the heuristic entity ruler, new NEs are added by the end user to provide only name and list in plain English words and the heuristic entity ruler converts components of the pipeline, the name and the list in plain English into a training format, wherein with the heuristic entity ruler for learning and unlearning requires less training time in the NLP pipeline only affects the selected NEs and remaining NEs are retained and provide high re-usability and any changes made do not require starting from scratch, wherein the heuristic entity ruler retains highest priority tagged NEs class and ensures the identified NEs by the earlier NLP components are not overwritten in subsequent components for consideration of the final suitable tag, where the NEs defined in the NLP pipeline as the last component that identified NEs by this component are of highest priority and overwrite the pre-existing tag, provide the sub-level relevant NEs and providing accurate information.

4. The system of claim 3, wherein the custom-built REGEX matcher enables class resolution between the plurality of NER-NEs and updated NEs, wherein the custom-built REGEX enables the user to customize or add new heuristic rules for entity ruler or custom regex as the knowledgebase to train the model with automatic relearning and unlearning, provide the extracted NEs or masking in a structured format.

5. One or more non-transitory machine-readable information storage mediums comprising one or more instructions which when executed by one or more hardware processors cause:

receiving, a text document comprising unstructured text;

converting the text document into another format for further processing, wherein the conversion of text document into the another format includes removing unreadable characters that do not get properly encoded in a text format, making clean document to send in natural language processing (NLP) pipeline;

preprocessing, the unstructured text by sequentially applying cleaning, tokenization divides larger chunks of text into smaller tokens for faster processing and converts string representation of data to numerical representation of data into a token and vectors by a tok2vec to speedup the processing time of NLP processes, vectorization, Parts of Speech (PoS) tagging, and parsing based on the PoS tagging and sentence semantics on the unstructured text to generate a parsed data for mapping dependency of various parts of sentences to each other;

applying:

i) a pretrained transformer-based NER model, on the parsed data to categorize the parsed data by identifying one or more NER model-NEs in the parsed data in accordance with a plurality of NE classes recognized by the pre-trained transformer-based NER model; and ii) a custom-built REGEX matcher on the parsed data, wherein the custom-built REGEX matcher is based on a set of customized REGEX rules associated with a REGEX knowledge base with an ability to learn and unlearn to capture NEs of given text completely and curated as per domain requirement, identify updated NEs for a domain of interest, find alphanumerical text and their variations, and handle complex requirements of patterns, wherein the updated NEs comprising (a) the one or more NER model-NEs, and (b) an expression associated with the one or more NER model-NEs, wherein the set of customized REGEX rules enable defining conventional REGEX patterns, semantic level rules and business rules that are expressed in patterns, wherein the one or more NER model-NEs among the plurality of NER model-NEs are part of the expression, combining the output of NER and regex and give single NE;

applying the NER in the NLP pipeline to identify suitable category or NE classes for the NE token; and applying, a heuristic entity ruler on the updated NEs enabling class resolution among the plurality of NE classes and a heuristic entity ruler defined NE classes to extract a final NE list from the unstructured data and associated frequency of occurrence of each NE among the final NE list, wherein the final NE list with a classification report is customizable to requirements of end user for diverse applications, wherein the heuristic entity ruler is based on a set of heuristic rules associated with an entity ruler knowledge base, wherein the knowledge base is continuously increased and allows the end user to add or update with business rules and feedback from the end user is added for next iterations of a NLP pipeline, wherein the class resolution states, all NEs identified by the pretrained transformer-based NER model and the custom-built REGEX matcher to be overwritten by the heuristic entity ruler if the heuristic entity ruler finds a new NE class, wherein the heuristic entity ruler defined NE classes are updated dynamically by training the heuristic entity ruler for deletion or addition of one or more NE classes without need for retraining the pretrained transformer-based NER model, wherein with the heuristic entity ruler, new NEs are added by the end user to provide only name and list in plain English words and the heuristic entity ruler converts components of the pipeline, the name and the list in plain English into a training format, wherein with the heuristic entity ruler for learning and unlearning requires less training time in the NLP pipeline only affects the selected NEs and remaining NEs are retained and provide high re-usability and any changes made do not require starting from scratch, wherein the heuristic entity ruler retains highest priority tagged NEs class and ensures the identified NEs by the earlier NLP components are not overwritten in subsequent components for consideration of the final suitable tag, where the NEs defined in the NLP pipeline as the last component that identified NEs by this component are of highest priority and overwrite the pre-existing tag, provide the sub-level relevant NEs and providing accurate information.

6. The one or more non-transitory machine-readable information storage mediums of claim 5, wherein the custom-built REGEX matcher enables class resolution between the plurality of NER-NEs and updated NEs, wherein the custom-built REGEX enables the user to customize or add new heuristic rules for entity ruler or custom regex as the knowledgebase to train the model with automatic relearning and unlearning, provide the extracted NEs or masking in a structured format.

* * * * *